(12) United States Patent
Takeda et al.

(10) Patent No.: US 11,826,752 B2
(45) Date of Patent: Nov. 28, 2023

(54) METHOD FOR PURIFYING PARTICLES, METHOD FOR DISPENSING A SINGLE PARTICLE, METHOD FOR ANALYZING CELL CLUSTER, AND APPARATUS USING THE SAME

(71) Applicant: ON-CHIP BIOTECHNOLOGIES CO., LTD., Tokyo (JP)

(72) Inventors: Kazuo Takeda, Tokyo (JP); Masayuki Ishige, Tokyo (JP); Yuu Fujimura, Tokyo (JP); Takahide Ino, Tokyo (JP); Yuji Morishita, Tokyo (JP); Kosuke Osawa, Tokyo (JP); Soichiro Tsuda, Tokyo (JP)

(73) Assignee: ON-CHIP BIOTECHNOLOGIES CO., LTD., Tokyo (JP)

( * ) Notice: Subject to any disclaimer, the term of this patent is extended or adjusted under 35 U.S.C. 154(b) by 0 days.

(21) Appl. No.: 17/445,789

(22) Filed: Aug. 24, 2021

(65) Prior Publication Data
US 2022/0062905 A1    Mar. 3, 2022

(30) Foreign Application Priority Data

Aug. 25, 2020    (JP) .................................. 2020-141895

(51) Int. Cl.
*B01L 3/00*    (2006.01)
*G01N 1/30*    (2006.01)
*G01N 15/14*    (2006.01)

(52) U.S. Cl.
CPC ... *B01L 3/502784* (2013.01); *B01L 3/502715* (2013.01); *G01N 1/30* (2013.01);
(Continued)

(58) Field of Classification Search
CPC ..... B01L 2200/0652; B01L 2200/0673; B01L 2400/0487; B01L 3/502715;
(Continued)

(56) References Cited

U.S. PATENT DOCUMENTS 6,976,590 B2    12/2005    Deshpande
7,268,167 B2    9/2007    Higuchi
(Continued)

FOREIGN PATENT DOCUMENTS

EP    2036976    3/2009
GB    2566002    10/2019
(Continued)

OTHER PUBLICATIONS

BD FACSAria III Cell Sorter Brochure, 2016, 14 pages.
(Continued)

*Primary Examiner* — Jennifer Wecker
(74) *Attorney, Agent, or Firm* — HESLIN ROTHENBERG FARLEY & MESITI PC; Jacquelyn A. Graff, Esq.

(57) ABSTRACT

One object of the present invention is to provide a method or apparatus for purifying target particles from high-concentration particles in a short time. The above problem can be solved by a method for purifying target particles, characterized in that the method comprises a step of sorting the target particles from a high concentration of non-target particles, wherein the sorting step is repeated for three times or more.

4 Claims, 10 Drawing Sheets

(A) Dispensing to plate from collection reservoir (B) Flow chart of dispensing after sorting

(52) U.S. Cl.
CPC ..... *G01N 15/1404* (2013.01); *G01N 15/1484* (2013.01); *B01L 2200/0673* (2013.01); *B01L 2400/0487* (2013.01); *G01N 2015/149* (2013.01)

(58) Field of Classification Search
CPC ......... B01L 3/502761; B01L 3/502784; G01N 1/30; G01N 15/1404; G01N 15/1484; G01N 2015/149
See application file for complete search history.

(56) References Cited

U.S. PATENT DOCUMENTS

| | | | |
|---|---|---|---|
| 8,993,311 | B2 | 3/2015 | Foster |
| 9,500,664 | B2 | 11/2016 | Ness |
| 2009/0020555 | A1* | 1/2009 | Noda ................... B01J 19/0046 422/400 |
| 2018/0298324 | A1* | 10/2018 | Takeda .............. B01L 3/502784 |
| 2020/0087654 | A1 | 3/2020 | Kubo et al. |

FOREIGN PATENT DOCUMENTS

| | | |
|---|---|---|
| WO | 2011154042 | 12/2011 |
| WO | 2012067259 | 5/2012 |
| WO | 2016182034 | 11/2016 |
| WO | 2018052137 | 3/2018 |
| WO | 2020054735 | 3/2020 |

OTHER PUBLICATIONS

Sony SH800S Cell Sorter Brochure, 2016, 14 pages.

Szczerba, B.M. et al., "Neutrophils escort circulating tumour cells to enable cell cycle progression", Nature, vol. 566, pp. 553-557 (2019).

Shapiro, Howard M., "Practical Flow Cytometry", 2003, 733 pages. https://Is.beckmancoulter.co.jp/files/appli_note/Couter_Practical_Flow_Cytometry.pdf.

* cited by examiner

|  |  | Target Cells | | | | | |
|---|---|---|---|---|---|---|---|
|  |  | 10^1 | 10^2 | 10^3 | 10^4 | 10^5 | 10^6 |
| Non target Cells | 10^5 | 1.8m | 1.8m | 1.8m | 1.8m | 1.8m | – |
|  | 10^6 | 20m | 20m | 20m | 20m | 20m | 20m |
|  | 10^7 | 3h | 3h | 3h | 3h | 3h | 3h |
|  | 10^8 | 30h | 30h | 30h | 30h | 30h | 30h |

FIG. 1

|  |  | Target Cells | | | | | | | | | | | |
|---|---|---|---|---|---|---|---|---|---|---|---|---|---|
|  |  | 10^1 | | 10^2 | | 10^3 | | 10^4 | | 10^5 | | 10^6 | |
|  |  | RS | JS | RS | JS | RS | JS | RS | JS | RS | JS | RS | JS |
| Non target Cells | 10^5 | 30m | 1.8m | 30m | 1.8m | 30m | 1.8m | 30m | 1.8m | 30m | 1.8m | – | – |
|  | 10^6 | 45m | 20m | 45m | 20m | 30m | 20m | 30m | 20m | 45m | 20m | 2h | 20m |
|  | 10^7 | 1h | 3h | 1h | 3h | 1h | 3h | 1h | 3h | 1h | 3h | 5.5h | 3h |
|  | 10^8 | 1h | 30h | 1h | 30h | 1h | 30h | 1h | 30h | 3.7h | 30h | 7.3h | 30h |

FIG. 2

Sliding movement of chip (A) Dispensing to plate from collection reservoir   (B) Flow chart of dispensing after sorting (A) Fluorocarbon droplet absorbed to wall surface of resin container (B) Water in oil droplet trapped at dome-shaped interface formed by mineral oil and fluorocarbon oil (A) Water in oil droplet formation region (B) Wide flow path region of downstream of droplet forming region

METHOD FOR PURIFYING PARTICLES, METHOD FOR DISPENSING A SINGLE PARTICLE, METHOD FOR ANALYZING CELL CLUSTER, AND APPARATUS USING THE SAME

CROSS REFERENCE TO RELATED APPLICATIONS

This application claims priority to Japanese Application No. 2020-141895 filed Aug. 25, 2020, the entire contents of which is incorporated herein by reference in its entirety.

TECHNICAL FIELD

The present invention relates to a method for purifying particles, a method for dispensing a single particle, a method for analyzing cell cluster, and an apparatus using the same.

BACKGROUND ART

In order to detect a specific cell in many various cells and analyze gene thereof, it is required to dispense individual particles. The present invention relates to a method for purifying about hundreds of cells out of about $10^8$ total cells, or a dispensing method. In addition, the present invention includes a method for sorting circulating tumor cells flowing in the blood of cancer patients, as an application example. Therefore, the present invention relates to a particle sorting and dispensing technology using a disposable tip wherein contamination of cells between different patients may be prevented. In the present specification, the particle includes a cell and a particle containing a droplet in oil.

Conventional technologies and their problems, regarding cell sorting technologies and dispensing technologies thereafter will be explained.

(1) Conventional Jet in Air Type Cell Sorter Technology

As disclosed in Non-patent literature 1, in the Jet in Air type, A droplet is formed from the nozzle, and the cells contained in the droplet are separated into individual droplets.

(2) Cell Sorting Technology in Micro Flow Path

The sorting rate in the sorting by a micro flow path is about 1000/second or less, which is slow. However, Patent literature 1 discloses a technique for improving throughput by parallel processing using a plurality of flow paths, and a technique for returning treated cells to the flow path and treating them again to improve sorting purity.

Patent literature 2 discloses a technique for improving sorting purity by continuously performing each process using a flow path chip having a plurality of sorting portions. Patent literature 2 discloses a method in which non-target cells are removed from a cell cluster using a micro flow-path chip with a reservoir, and the remaining cells are returned to the upstream sample reservoir and sorted.

Patent literature 3 discloses a sorting technique using a pulse flow in a micro flow-path chip with reservoirs. Further, Patent literature 4 discloses a method in which non-target cells are removed by sorting in a micro flow-path chip, the remaining cells are collected from a discharged liquid reservoir, and then returned to an upstream sample reservoir, and the negative sorting is repeated (repeated negative sorting method).

(3) Single Cell Dispensing Technology

If necessary, the sorted cells may be dispensed individually into a multi-well plate. This technique and problems are described. As a method for selecting the target cells contained in the various cells and dispensing the cells into the multi-well plate, Non-patent literature 2 discloses a method of directly dispensing droplets sorted by an Jet in Air type cell sorter onto a multi-well plate. Patent literature 5 discloses a method of identifying a target cell by image recognition and then dispensing it as a droplet onto a multi-well plate under piezo pressure. This method has the problem that the size of the ejectable droplets is limited when piezo pressure is used. Patent literature 6 discloses a technique in which a cell to be dispensed is sucked up from a suspension with a pipette, the inside of the pipette is photographed, and then when it is recognized that one cell is contained, the cell is dispensed.

(4) Dispensing Technique of Water in Oil Droplet

As mentioned above, there are multiple techniques for single-cell dispensing. However, when the water in oil droplet in oil is dispensed, the water in oil droplet which is settle in the oil as a droplet can be dispensed in the same way as cells.

However, the fluorocarbon oil used in droplet digital PCR or single-cell expression analysis has a large specific gravity. Therefore, since water in oil droplets float in the oil, it is difficult to dispense the water in oil droplets by dropping them from above. Patent literature 7 discloses a method for dispensing water in oil droplets in a fluorocarbon oil.

(5) Cell Analysis Technology by Flow Cytometry

Non-patent literature 3 discloses the conventional flow cytometry technique and analysis method.

CITATION LIST

Patent Literature

[Patent literature 1] U.S. Pat. No. 6,976,590 B2
[Patent literature 2] U.S. Pat. No. 8,993,311B2
[Patent literature 3] WO 2012/067259 A1
[Patent literature 4] WO 2016/182034 A1
[Patent literature 5] WO 2011/154042 A1
[Patent literature 7] WO 2018/052137 A1
[Patent literature 8] GB 2566002 A
[Patent literature 6] U.S. Pat. No. 7,268,167 B2
[Patent literature 7] U.S. Pat. No. 9,500,664 B2

Non-Patent Literature

[Non-patent literature 1] FACS Aria III pamphlet
[Non-patent literature 2] SONY SH800S pamphlet
[Non-patent literature 3] https://ls.beckmancoulter.co.jp/files/appli_note/Couter_Practical_Flow_Cytometry.pdf
[Non-patent literature 4] Szczerba, B. M. et al., Nature volume 566, pages 553-557(2019)

SUMMARY OF INVENTION

Technical Problem (1) Problems with Conventional Jet in Air Type Cell Sorter Technology The sorting rate in the Jet in Air type cell sorter is about 104/second, which is fast. However, the number of cells contained in the droplet should be 1 or less. In the Jet in Air method, the formed droplet is released at high speed into the atmosphere. Immediately before the droplet is released, the droplet containing a target cell is charged, and the direction of ejection is changed by the electric field, and the droplets are collected. This method causes great cell damage because the droplets collide with the wall surface of the collection tube from the atmosphere at high speed. Therefore, it is necessary to collect cells with sufficient purity in one sorting processing. That is, in order to obtain sufficient purity in one processing, it is necessary to dilute the cells. Therefore, the larger the number of cells, the longer the processing time.

When the sorting rate is 30,000 times/second, the processing time for the purity after sorting to be 98% or more was determined by Poisson distribution analysis. The results are shown in FIG. 1. As shown in FIG. 1, when the total number of cells is $10^8$, the processing time is 30 hours, which is unrealistic. Accordingly, when the total number of cells is large, a dilution is necessary, and thus there is a problem that the processing time is long.

(2) Problems with Conventional Cell Sorting Technology in Micro Flow Path

In the sorting by the micro flow path, cells tend to remain in the flow-path chip after sorting. Therefore, when sorting is repeated, there is a problem that the contaminating cells remaining in the flow-path chip have a great influence on the final purity.

(3) Problems with Single Cell Dispensing Technology

In the method of directly dispensing the droplets sorted by the Jet in Air cell sorter onto the multi-well plate, the multi-well plate is moved step-and-repeat in the atmosphere and each droplet is dispensed into a different well. However, if the time between sorting events of the target cells is shorter than the moving time of the multi-well plate to which the target cells are dispensed, there is a problem that the target cells are not dispensed. Furthermore, the size of the cells to be dispensed is limited because the droplets are formed from the nozzles. That is to say, the size of the cells to be sorted is limited to those smaller than the size of the droplets to be sorted. In addition, in the method of sucking up cells from the suspension containing the cells to be dispensed with a pipette and dispensing after confirming that only one cell exists by image recognition, there is a problem that the throughput is low because the dispensing time is long.

(4) Problems with Dispensing Technique of Water in Oil Droplets

Water in oil droplets in fluorocarbon oil float because fluorocarbon oil has a higher specific density than water. Moreover, in a resin container, the droplets easily move to the wall surface of the upper part of the fluorocarbon oil container. Therefore, it is not possible to individually suck up the water in oil droplets with the pipette and then eject and dispense them.

(5) Problems with Emulsion Formation Method

In the method of forming water in oil droplets in a fluorocarbon oil, the problems of the method of collecting water in oil droplets using the reservoirs formed on the microflow-path chip are as follows. That is, when the amount of emulsion in the collection reservoir increases and the upper surface of the fluorocarbon oil becomes higher, a force in the backflow direction of the oil is generated due to the mass of the oil. Therefore, there is a problem that the flow velocity becomes slower as the upper surface becomes higher.

(6) Problems with Cluster Cell Analysis Technology by Flow Cytometry

Current flow cytometric analysis is based on a distribution derived from data of a large number of cells. Therefore, with respect to data of cell(s), it is impossible to determine whether the data indicates a large cell or a mass of multiple cells, and it is also impossible to quantitatively determine it. According to Non-patent literature 3, the cell data is an analysis of the relative position of the cell population on a two-dimensional scatter plot, and thus, there is a problem that it does not have a criterion based on a quantitative numerical threshold. Specifically, a following technique is required. That is, it is rapidly determined whether several circulating tumor cells (CTCs) in the blood obtained by the above-mentioned repeated sorting are one large cell or a CTC in a cluster of multiple cells based on numerical values, and counted. This is because it is reported that CTCs in neutrophil clusters shorten the prognosis of cancer patients (Non-Patent literature 4).

Therefore, one object of the present invention is to provide a method or apparatus for purifying target particles from high-concentration particles in a short time. Another object of the present invention is to provide a method or apparatus for reliably dispensing a single particle. Further, another object of the present invention is to provide a method for reliably dispensing water in oil droplets in fluorocarbon oil. Furthermore, another object of the present invention is to provide a method or apparatus capable of determining whether a cell analyzed by a flow cytometer is a single cell or a cell cluster.

Solution to Problem

The present inventors have conducted intensive studies into a method or apparatus for purifying target particles from high-concentration particles in a short time, and as a result, surprisingly found that the target particles can be purified in a short time by repeatedly sorting high-concentration particles. Further, the present inventors have conducted intensive studies into a method or apparatus for reliably dispensing a single particle, and as a result, surprisingly found that a single particle can be reliably dispensed by sorting each one particle into a collection reservoir connected to a flow path and dispensing the one particle from the collection reservoir to another container. Further, the present inventors have conducted intensive studies into a method for reliably dispensing water in oil droplets in fluorocarbon oil, and as a result, surprisingly found that the water in oil droplets in fluorocarbon oil can be reliably dispensed by using a fluorocarbon oil and mineral oil. Furthermore, the present inventors have conducted intensive studies into a method or apparatus capable of determining whether a cell analyzed by a flow cytometer is a single cell or a cell cluster, and as a result, surprisingly found that the single cell and the cell cluster can be easily determined by calculating a ratio between a forward scattered light signal intensity and a scattered light signal intensity other than forward.

The present invention is based on the above findings.

Accordingly, the present invention relates to

[1] a method for purifying target particles, characterized in that the method comprises a step of sorting the target particles from a high concentration of non-target particles, wherein the sorting step is repeated for three times or more,

[2] a method for purifying target particles, characterized in that the method comprises a step of sorting the target particles from a high concentration of non-target particles, wherein a primary concentration of non-target particles is $10^8$ particles/mL or more, and the sorting is repeated,

[3] the method for purifying target particles of item [1] or [2], wherein primary numbers of total particles containing the target particles is $10^8$ or more,

[4] the method for purifying target particles of items [1] to [3], wherein the particles are cells,

[5] the method for purifying target particles of items [1] to [4], wherein the target particles are fluorescently-stained, the non-target particles are fluorescently-stained after one or more sorting step, and then the sorting step is carried

[6] the method for purifying target particles of items [1] to [5], further comprising a sorting step for sorting one particle,

[7] a method for dispensing a single particle, characterized in that the method comprises a step of sorting each one particle into a collection reservoir connected to a flow path and dispensing the one particle from the collection reservoir to another container,

[8] an apparatus for purifying target particles, capable of repeatedly sorting target particles, characterized in that the apparatus comprises a flow-path chip for separating particles contained in a sample liquid, wherein the flow-path chip has flow paths formed in a transparent substrate, and has a sample liquid reservoir, a sheath liquid reservoir, a sorting reservoir, a collection reservoir, and a discharged liquid reservoir which are fluidically-connected to the flow paths, and wherein a liquid flow in the flow paths is controlled by an air pressure above each reservoir, wherein the flow-path chip has an introduction flow path from the sample liquid reservoir, a confluence flow path in which a pair of sheath liquid introduction flow paths arranged on both sides are joined to the introduction flow path, an illumination region for detecting the particle at downstream of the confluence flow path, and a pair of branched flow paths that are connected to the side of the confluence flow path so as to face each other at further downstream of the confluence flow path, and wherein the sorting reservoir is connected to one of the pair of branched flow paths, the collection reservoir is connected to the other of the branched flow paths, an upper part of the collection reservoir can be opened to atmospheric pressure, and the sample liquid reservoir can be opened to atmospheric pressure, and wherein the flow-path chip can be moved laterally when sorting is repeated, and liquid movement between each reservoir, liquid movement from each reservoir to the outside, and liquid addition from the outside to each reservoir are configured to perform from the above of the reservoirs,

[9] an apparatus for singly dispensing a target particle, capable of sorting target particles, wherein the apparatus comprises a flow-path chip for separating particles contained in a sample liquid, wherein the flow-path chip has flow paths formed in a transparent substrate, and has a sample liquid reservoir, a sheath liquid reservoir, a sorting reservoir, a collection reservoir, and a discharged liquid reservoir which are fluidically-connected to the flow paths, and wherein a liquid flow in the flow paths is controlled by an air pressure above each reservoir, wherein the flow-path chip has an introduction flow path from the sample liquid reservoir, a confluence flow path in which a pair of sheath liquid introduction flow paths arranged on both sides are joined to the introduction flow path, an illumination region for detecting the particle at downstream of the confluence flow path, and a pair of branched flow paths that are connected to the side of the confluence flow path so as to face each other at further downstream of the confluence flow path, and wherein the sorting reservoir is connected to one of the pair of branched flow paths, the collection reservoir is connected to the other of the branched flow paths, and an upper part of the collection reservoir can be opened to atmospheric pressure, and wherein the apparatus comprises a configuration in which sorting is stopped after sorting one target particle into the collection reservoir and one target particle is dispensed from the collection reservoir into another container,

[10] the method for dispensing a single particle of item [7], wherein the particle is a water in oil droplet in a fluorocarbon oil, the fluorocarbon oil and a mineral oil are contained in the collection reservoir in advance, a target water in oil droplet is sorted based on a fluorescence signal, the water in oil droplet is taken up in the collection reservoir one by one, and the water in oil droplet is trapped at the dome-shaped interface between the fluorocarbon oil and mineral oil in the collection reservoir, and the water in oil droplet is sucked up from up above and dispensed into an external container,

[11] a method for analyzing cell cluster by analyzing flow cytometry data, characterized in that a ratio between a forward scattered light signal intensity and a scattered light signal intensity other than forward detected in each cell is calculated, and by the obtained value of the ratio, whether individual cells are single cells or cell cluster are identified,

[12] the A method for analyzing cell cluster of item [11], wherein the target cells are circulating tumor cells, the circulating tumor cells are fluorescently-stained, and wherein whether the circulating tumor cells are single cells or cell cluster are analyzed by a combination with a fluorescence signal, and

[13] an apparatus for analyzing cell cluster using a flow cytometer, wherein ratios between plural scattered light signals are calculated, and by using values thereof, whether single cell or cell cluster is identified.

Advantageous Effects of Invention

According to the method for purifying particles and the apparatus for purifying particles of the present invention, the problems with conventional Jet in Air type cell sorter technology can be solved. That is to say, target particles can be purified from high-concentration particles in a short time. For example, target cells can be purified within a few hours from non-target cells with a total number of $10^8$ cells. Further, according to another embodiment of the present invention, the problems with conventional cell sorting technology in micro flow path can be solved. That is to say, in an automatic operation during repeated sorting, the cells remaining in the flow path chip can be washed and removed as many times as necessary.

According to the method for dispensing a single particle and the apparatus for dispensing a single particle of the present invention, the problems with single cell dispensing technology can be solved. That is to say, according to the method for dispensing a single particle and the apparatus for dispensing a single particle of the present invention, the single cell can be reliably dispensed. Specifically, the problem that the target cells are not dispensed, if the time between sorting events of the target cells is shorter than the moving time of the multi-well plate to which the target cells are dispensed, can be solved.

According to the method for dispensing a single particle and the apparatus for dispensing a single particle of the present invention, the problems with dispensing technique of a water in oil droplet in fluorocarbon oil can be solved.

That is to say, the water in oil droplet in fluorocarbon oil can be reliably dispensed. Specifically, the following problems can be solved. The problem is that the droplets float because the fluorocarbon oil has a higher specific density than water, and the floated droplets adsorb on the resin wall surface after floating, and thus it is difficult to suck up with a pipette. Furthermore, when the amount of emulsion in the collection reservoir increases and the upper surface of the fluorocarbon oil becomes higher, the problem that a force in the backflow direction of the oil is generated due to the mass of the oil can be solved.

According to the method for analyzing data of the present invention, the problems with cluster cell analysis technology by flow cytometry can be solved. That is to say, for each detected cell or cell mass, it is possible to determine whether the cell is a large single cell or a mass of multiple cells based on a quantitative numerical value.

BRIEF DESCRIPTION OF THE DRAWINGS

FIG. 1 is a table showing results wherein the processing time for the purity after sorting to be 98% or more is determined by Poisson distribution analysis, when the sorting rate is 30,000 times/second by Jet in Air type cell sorter.

FIG. 2 is a table showing a comparison of the processing times for the purity after sorting to be 98% or more between the Jet in Air sorting (JS), and repeated sorting according to the method for purifying particles of the present invention (RS). The sorting rate of Jet in Air sorting is 30,000/second, and the sorting rate of the repeated sorting of the present invention is 1000/second.

In addition to the lateral movement of the flow path tip,
the vertical movement and the horizontal movement of
the dispensing pipette is required.

Figure 7:
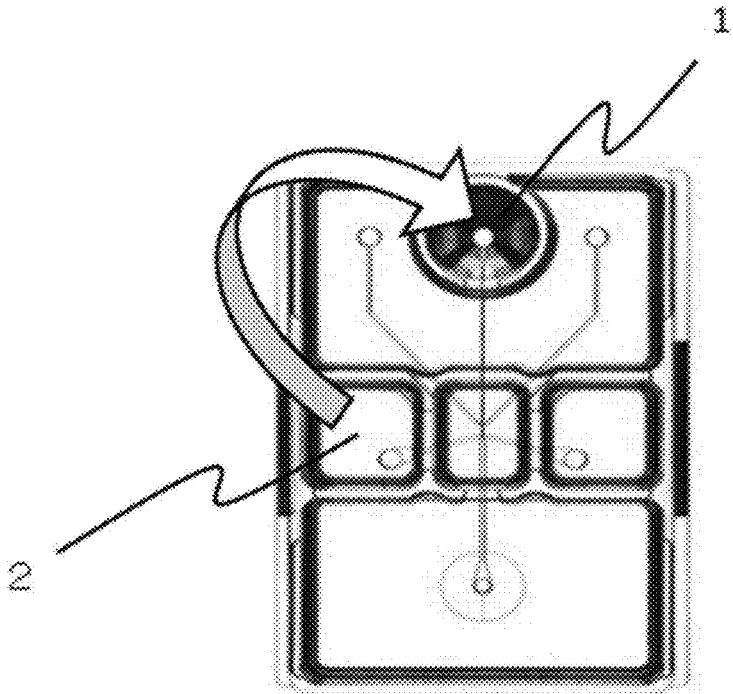

FIG. 7 is a view showing a liquid transfer from the collection reservoir to the sample liquid reservoir which is an operation for the repeated sorting in the present invention.

Figure 8:
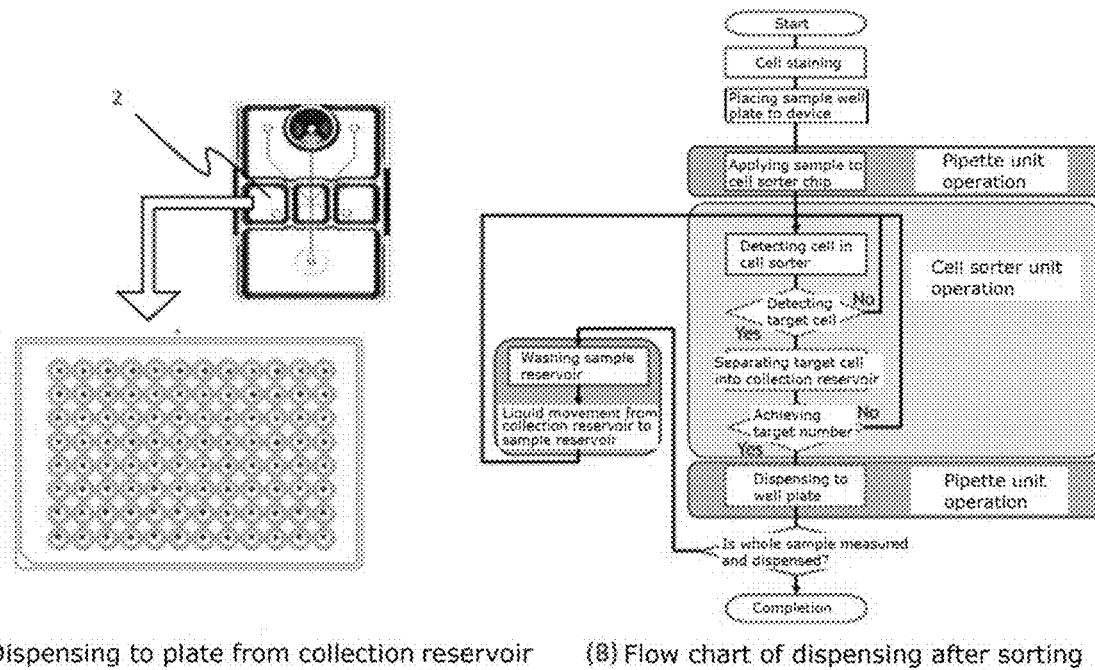

FIG. 8 is a view showing a dispensing from the collection reservoir to the container (each well in the multi-well plate) in the method for dispensing a single particle (A) and a flow chart of the method for dispensing a single particle (B).

Figure 9:
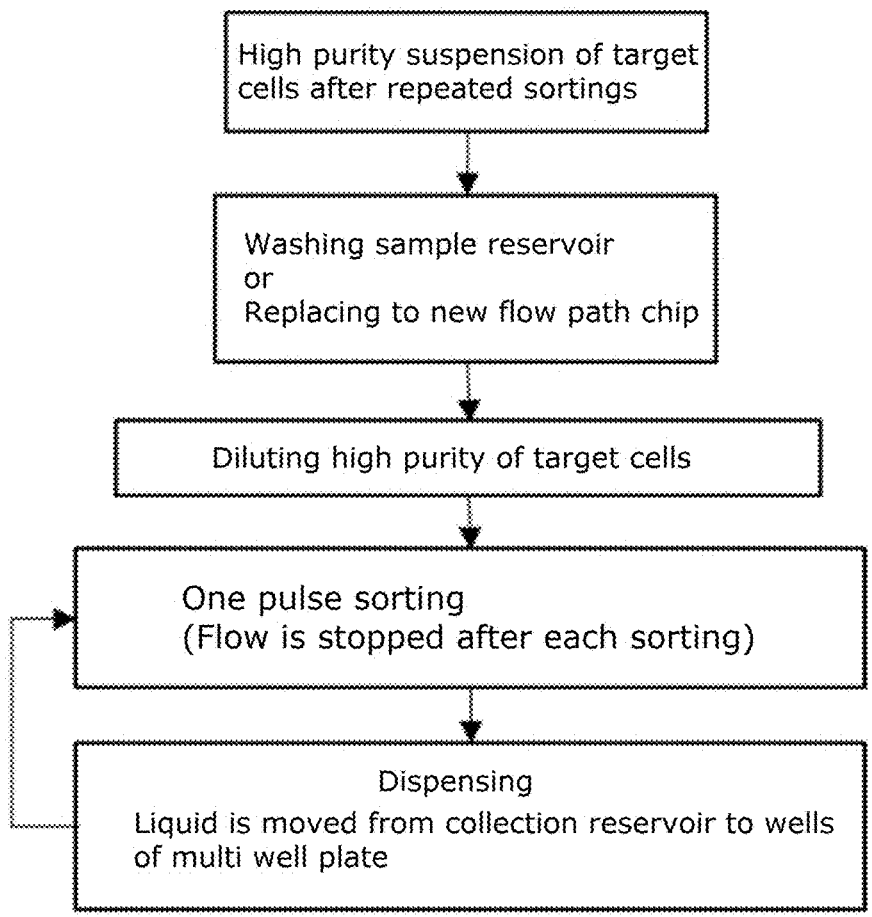

FIG. 9 is a flow chart for carrying out the method for dispensing a single particle of the present invention after the repeated sorting.

Figure 10:
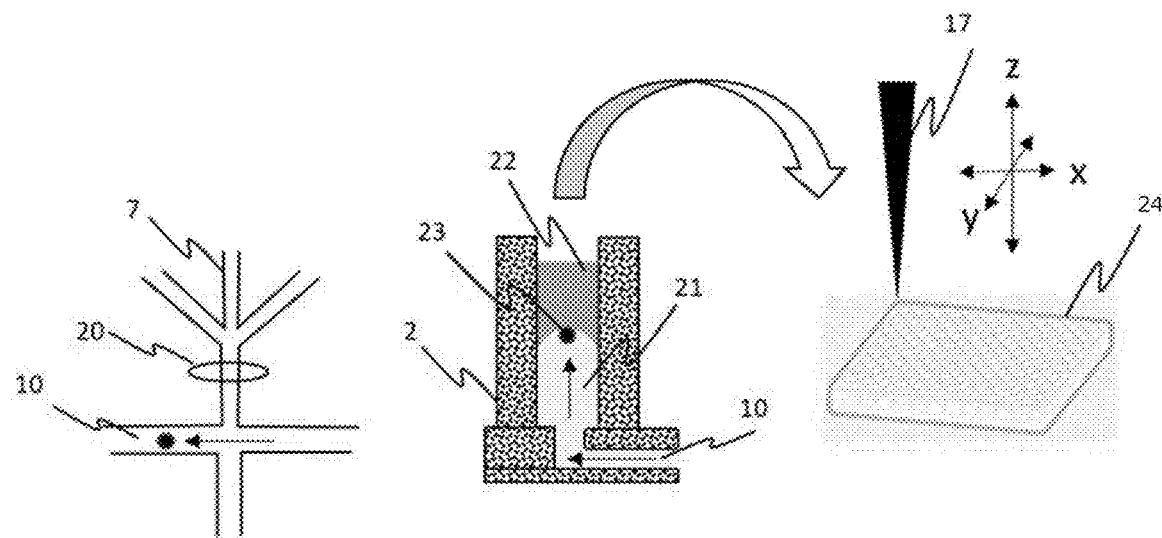

FIG. 10 is a view showing an operation of the method for dispensing a single particle using the water in oil droplet of the present invention. First, the water in oil droplets are taken into the branched flow path in the flow path chip one by one by using the fluorocarbon oil as a sheath liquid. Then, the sorted water in oil droplets are trapped at the dome-shaped interface of two kinds of oils, i.e. fluorocarbon oil and mineral oil in the collection reservoir (see photograph in FIG. 11), and finally they are dispensed from the collection reservoir into a container outside the apparatus.

Figure 11:
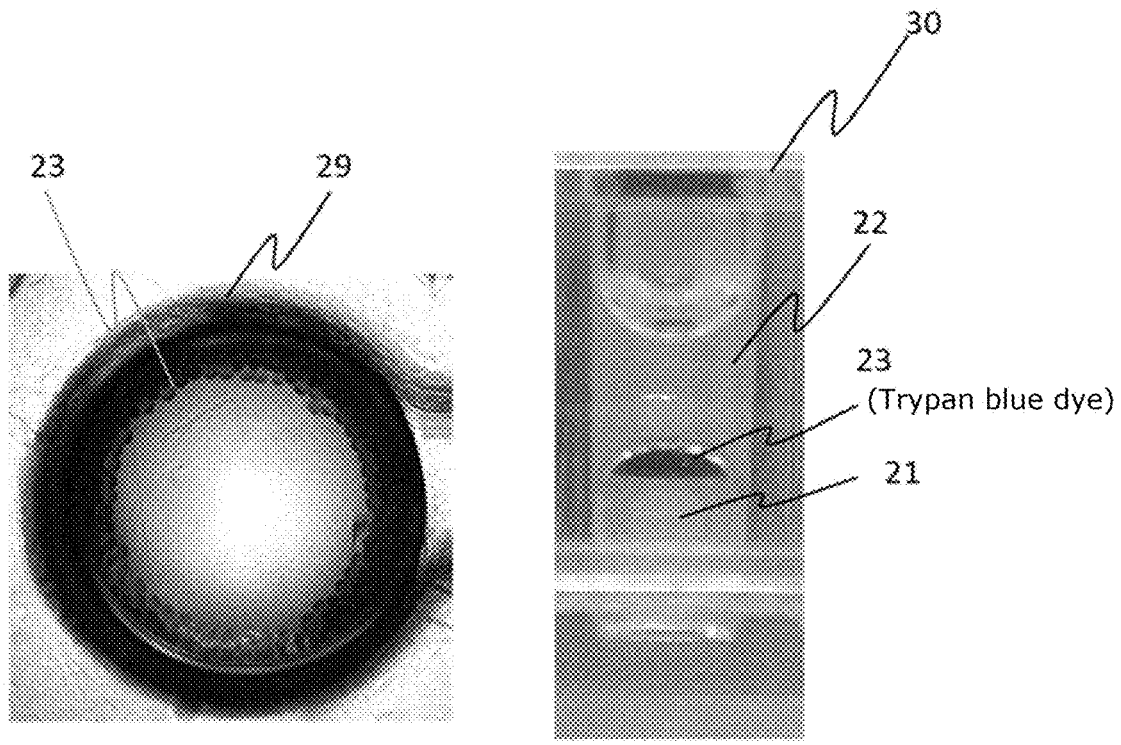

FIG. 11 is a photograph showing that the water in oil droplets are adsorbed to the wall surface of the plastic resin in the absence of the mineral oil (A) and a photograph showing that the mineral oil and the fluorocarbon oil forms the dome-shaped interface and the water in oil droplets are trapped at an upper of the dome-shaped interface (B), in the method for dispensing a single particle of the present invention.

Figure 12:
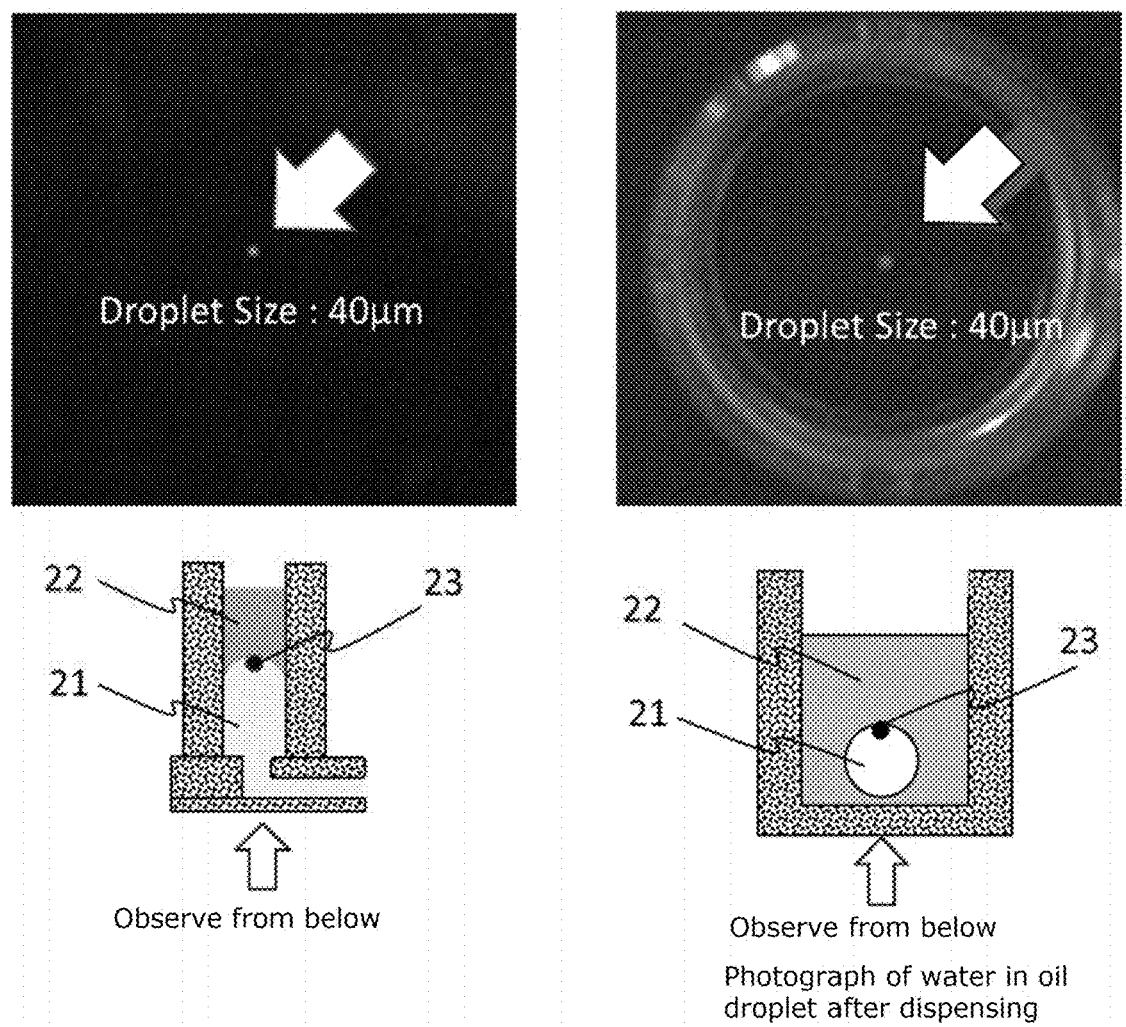

FIG. 12 is a microscope photograph showing the water in oil droplet (40 μm of diameter) trapped an inside the upper part of the dome-shaped interface between the fluorocarbon oil and the mineral oil, (A), and a microscope photograph of the water in oil droplet which is sucked up with the pipette of the dispensing head and dispensed into the wells in the 384-well plate together with the mineral oil and the fluorocarbon oil (B), in which the microscope photographs are taken from the bottom of the collection reservoir before dispensing, in the method for dispensing a single particle of the present invention.

Figure 13:
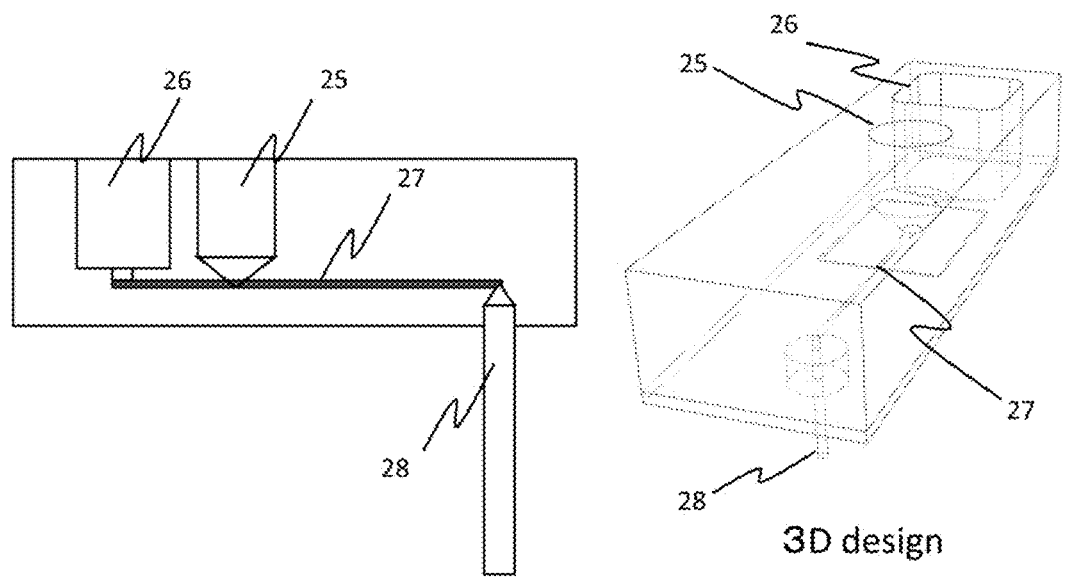

FIG. 13 is views showing an embodiment of the configuration (i.e., a configuration without collection reservoir) of the flow-path chip wherein the water in oil droplets are formed in the fluorocarbon oil, and the water in oil droplets are collected by the vertical tube.

Figure 14:
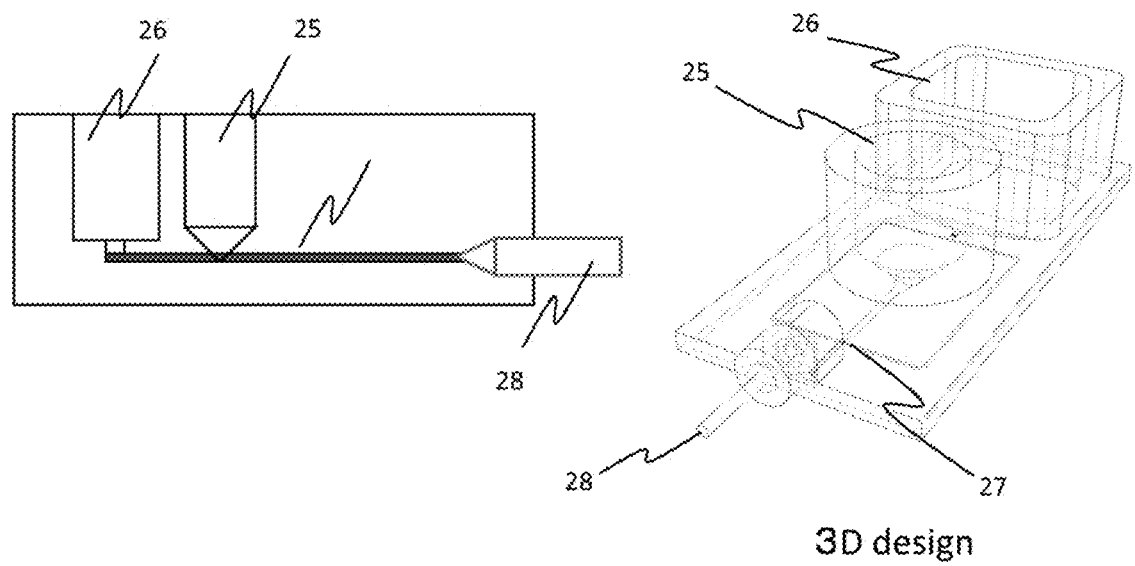

FIG. 14 is views showing an embodiment of the configuration (i.e., a configuration without collection reservoir) of the flow-path chip wherein the water in oil droplets are formed in the fluorocarbon oil, and the water in oil droplets are collected by the horizontal tube.

Figure 15:
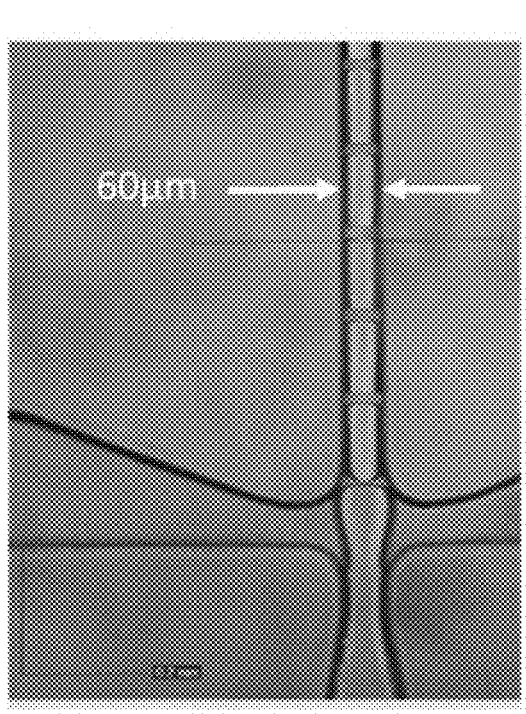
Figure 15:
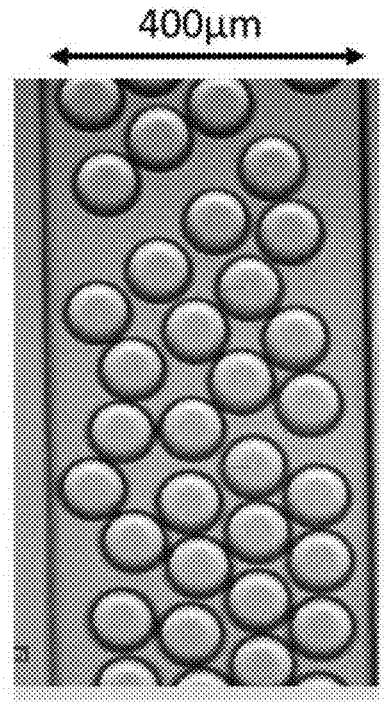
Figure 16:
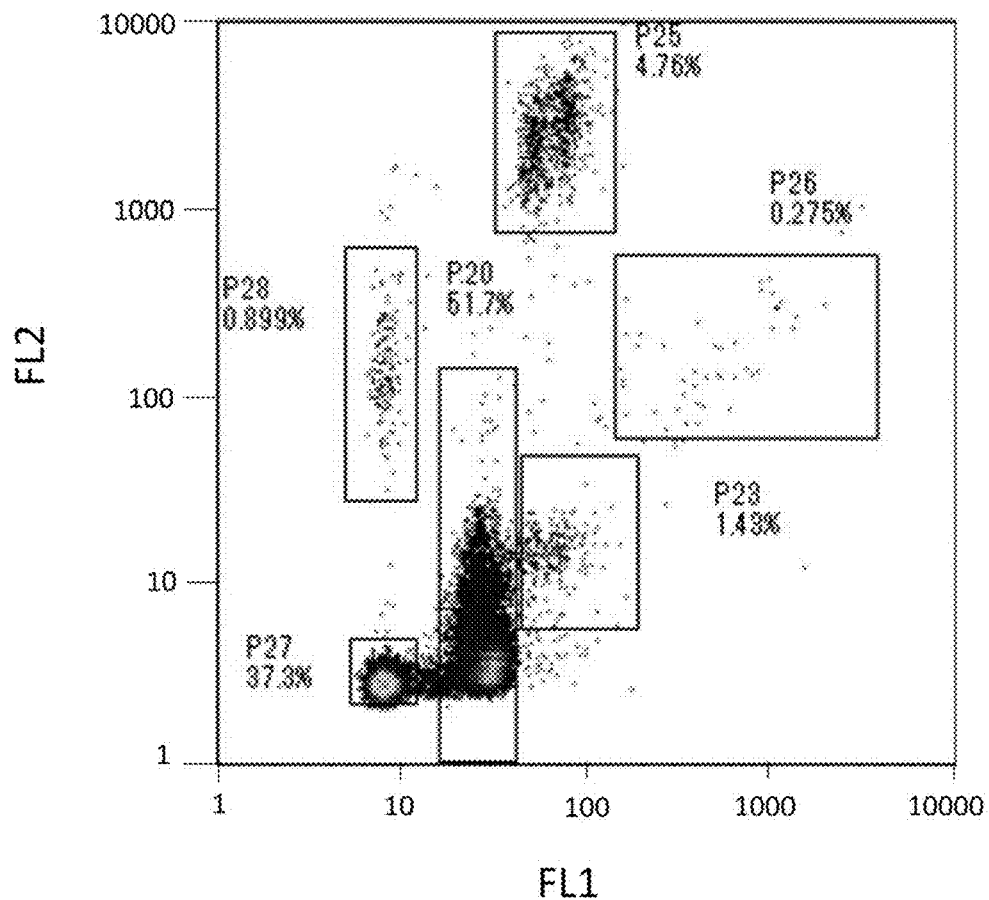

FIG. 15 is a photograph of the droplet forming flow path region (A) and a photograph of the wide flow path region (B) of downstream of the droplet forming flow path region, when the water in oil droplets are formed by using emulsion forming flow-path chip for a collection method using a vertical tube FIG. 16 is a flow cytometry data of mixture of leukocytes, leukocyte clusters, and PC-9 cells (cell line) stained with cytokeratin antibody and nuclear-stained with Hoechst.

Figure 17:
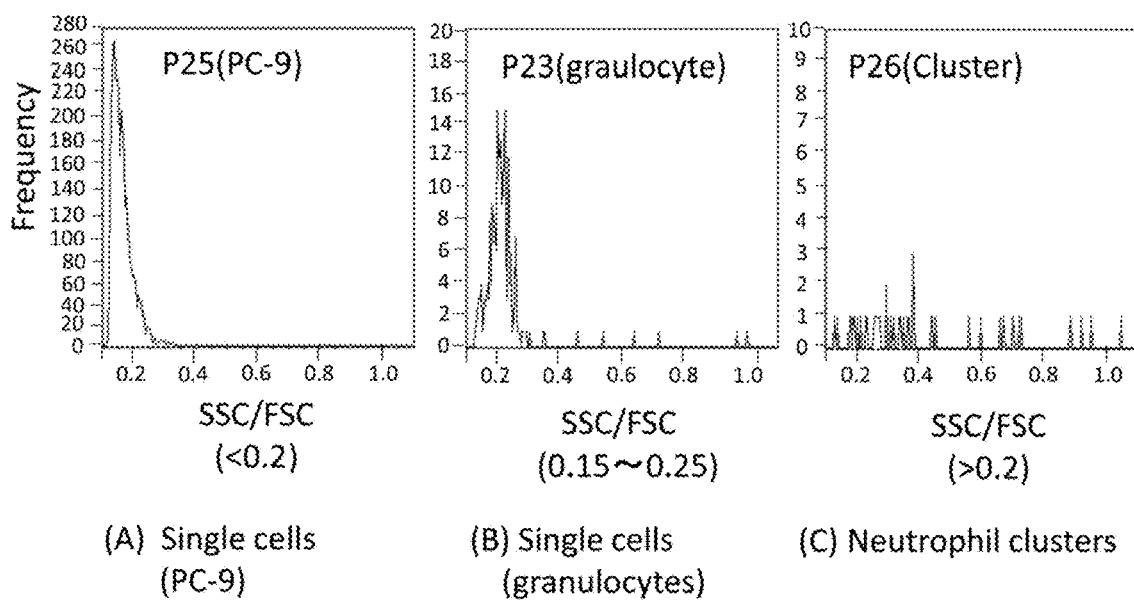

FIG. 17 is a histogram distribution of SSC/FSC values (A), histogram distribution of SSC/FSC values of granulocytes which are leukocyte component (B), and histogram distribution of SSC/FSC values of leukocyte clusters (C), in the low cytometry data of mixture of leukocytes, leukocyte clusters, and PC-9 cells (cell line) stained with cytokeratin antibody and nuclear-stained with Hoechst.

Figure 18:
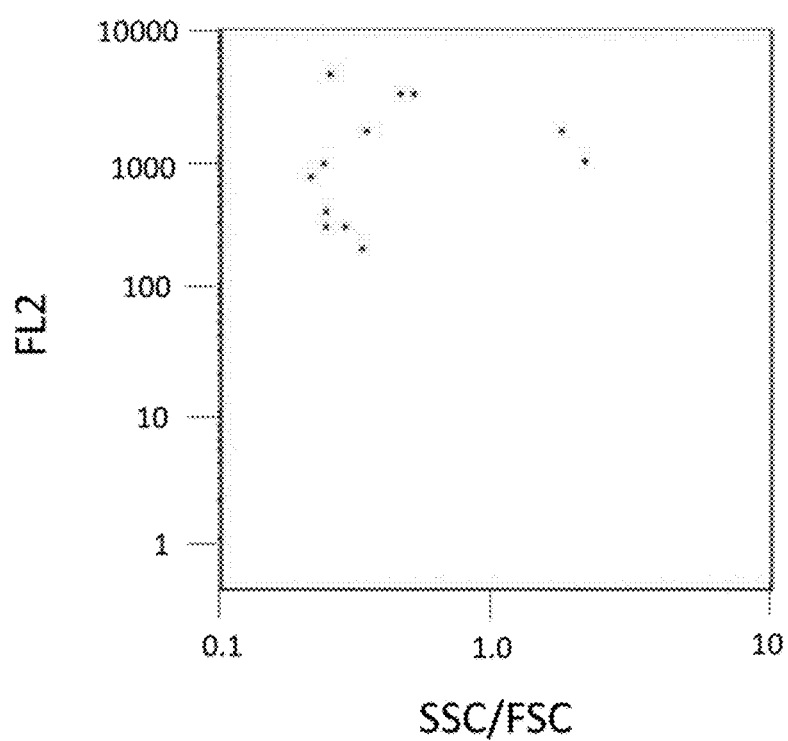

FIG. 18 is a two-dimensional scatter plot of cytokeratin fluorescence signal intensity and SSC/FSC value of CTC taken from the blood of cancer patients.

DESCRIPTION OF EMBODIMENTS

[1] Method for Purifying Particles

The method for purifying particles of the present invention is for purifying target particles. The method is characterized in that it comprises a step of sorting the target particles from a high concentration of non-target particles, wherein the sorting step is repeated for three times or more.

In the present specification, the term "particle" includes a cell. Further, the "particle" may be a water in oil droplet. Furthermore, the water in oil droplet may contain a cell. In addition, the target particle means a particle to be purified, and the non-target particle means a particle different from the target particle, which is removed by sorting.

<<Sorting Step>>

The number of the sorting step is not limited, so long as it is carried out three times or more. The number of the sorting step is preferably 3 or more, more preferably 4 or more. The upper limit thereof is not particularly limited, but is 6 or less, more preferably 5 or less.

The required number of the repeated sorting varies depending on 1) the number of non-target cells in the initial sample liquid, 2) the number of target cells, 3) the residual rate of non-target cells after sorting, 4) the recovery rate of target cells after sorting, and 5) the final purity of the target cells. For example, the required number of repeated sorting is calculated to be 4 times. when the number of non-target cells is $10^8$, the number of target cells is 100, the residual rate of non-target cells after sorting is 1%, the recovery rate of target cells after sorting is 95%, and the final purity of target cells is 98%. Further, when the number of target cells is 10, the required number of repeated sorting is 5 times.

The initial concentration of the non-target particles in the method for purifying particles of the present invention is not particularly limited, but is, for example, $10^6$/mL or more, preferably $10^7$/mL or more, more preferably $2 \times 10^7$/mL or more, further preferably $5 \times 10^7$/mL or more, further preferably $7 \times 10^7$/mL or more, further preferably $1 \times 10^8$/mL or more, further preferably $2 \times 10^8$/mL or more.

In the sorting step, the concentration of the non-target particles (or the concentration of the total particles) decreases because the non-target particles are removed each time the step is repeated.

The total particle numbers in the method for purifying particles of the present invention is not particularly limited, but is, for example, $10^6$ or more, preferably $10^7$ or more, more preferably $2 \times 10^7$ or more, further preferably $5 \times 10^7$ or more, further preferably $7 \times 10^7$ or more, further preferably $1 \times 10^8$ or more, further preferably $2 \times 10^8$ or more.

In the method for purifying particles of the present invention, the target particles are fluorescently-stained, and the non-target particles are fluorescently-stained after one or more sorting step, and then the sorting step can be carried, but is not limited thereto. The target particles and non-target particles may be specifically stained by the fluorescence staining before the sorting step, and then may be sorted. However, only the target particles are fluorescently-stained and then the sorting step may be carried out. In the purifying method of the present invention, a comparatively high concentration of non-target particles is used. Therefore, when the non-target particles are fluorescently-stained before a first sorting, it is necessary to use a large amount of antibody. However, when the non-target particles are fluorescently-stained after one or more sorting step, the amount of antibody used for fluorescent staining of non-target particles can be reduced since the number of non-target particles is reduced.

The method for purifying particles of the present invention is not limited, but may further comprise a sorting step for sorting one particle. The "sorting one particle" can be performed according to the "the method for dispensing a single particle" described later.

It will be explained by using the results of numerical simulation that the problem with Jet in Air type cell sorter can be solved by the method for purifying particles of the present invention.

The processing time of the method of the present invention, in which the sample liquid containing high-concentration cells is repeatedly sorted to the required purity, and the processing time of the method, in which a sample liquid containing high-concentration cells is diluted to a low concentration sample liquid wherein only one cell is contained in the sorted droplets to obtain the desired purity in one sorting processing, were compared by the numerical simulation. FIG. 2 shows the comparison result of the processing times between Jet in Air sorting (JS) and repeated sorting (RS) of the present invention. In the same manner as FIG. 1, the processing time for obtaining a purity of 98% or more was calculated by Poisson distribution. The sorting rate of Jet in Air sorting is 30,000/second, and the sorting rate of the repeated sorting of the present invention is 1000/second. When there are $10^8$ non-target cells, the processing time of Jet in Air sorting is 30 hours due to the increase in the volume of the sample liquid by dilution. On the other hand, the processing time for the repeated sorting is completed in a short time because the sample liquid does not need to be diluted and the volume thereof is small. In a method of shortening the processing time of sorting to separate target cells when there are a large number of cells, it is not necessary to sort a single target cell in one sorting. Even under cell concentration conditions where some non-target cells are accidentally sorted, the target cells can be purified to the desired purity by repeating sorting.

The apparatus for purifying target particles of the present invention can repeatedly sort target particles. The apparatus for purifying target particles comprises a flow-path chip for separating particles contained in a sample liquid, wherein the flow-path chip has flow paths formed in a transparent substrate, and has a sample liquid reservoir, a sheath liquid reservoir, a sorting reservoir, a collection reservoir, and a discharged liquid reservoir which are fluidically-connected to the flow paths, and wherein a liquid flow in the flow paths is controlled by an air pressure above each reservoir. The flow-path chip has an introduction flow path from the sample liquid reservoir, and a confluence flow path in which a pair of sheath liquid introduction flow paths arranged on both sides are joined to the introduction flow path. It has an illumination region for detecting the particle at downstream of the confluence flow path, and a pair of branched flow paths that are connected to the side of the confluence flow path so as to face each other at further downstream of the confluence flow path. Further, the sorting reservoir is connected to one of the pair of branched flow paths, the collection reservoir is connected to the other of the branched flow paths, an upper part of the collection reservoir can be opened to atmospheric pressure, and the sample liquid reservoir can be opened to atmospheric pressure.

The flow-path chip can be moved laterally when sorting is repeated, and liquid movement between each reservoir, liquid movement from each reservoir to the outside, and liquid addition from the outside to each reservoir are configured to perform from the above of the reservoirs.

A method of the repeated sorting will be specifically explained. An apparatus for separating particles comprising a disposable flow-path chip wherein a flow path is formed in a flat substrate, an illumination unit configured to illuminate particles in a sample liquid flowing through the flow path, a detection unit configured to detect target particles by detecting a scattered light or fluorescence generated from the particle when the particle is illuminated, and identifying the particle based on its signal intensity, a constant air pump (such as an electropneumatic regulator or a cylinder pump) which applies a pressure pulse to the particles in the sample liquid flowing through the flow path in the flow-path chip, and an electromagnetic valve connected thereto, and a control unit configured to control a movement of the electromagnetic valve based on the signal from the detection unit, is used. A sample liquid reservoir is formed in the flow path tip, and a constant positive pressure air pump for controlling the flow rate of the sample liquid is airtightly connected to a gas space above the reservoir via an adapter for the sample liquid reservoir. The introduction flow path for the sample liquid is connected to a bottom of the sample liquid reservoir. The disposable flow-path chip comprises a pair of sheath liquid introduction flow path, arranged on both sides of the introduction flow path for the sample liquid; a confluence flow path for joining the introduction flow path for the sample liquid and the pair of the sheath liquid introduction flow path, in which the sheath liquid flows along either side of the sample liquid in the confluence flow path; an illumination region on the confluence flow path, and a pair of oppositely-branched flow paths connected to the confluence flow path, downstream of the illumination region. In one of the pair of oppositely-branched flow paths, an electromagnetic valve, which is normally closed, and a constant positive pressure pump are airtightly connected to the sorting reservoir via an adapter for the sorting reservoir. A collection reservoir is connected to the other of the branched flow paths. However, an upper space of the collection reservoir can be opened to atmospheric pressure. A discharged liquid reservoir is connected at downstream of the confluence flow path. In the upper gas space of the discharged liquid reservoir, a constant negative pressure air pump with a pressure lower than atmospheric pressure is airtightly connected to the discharged liquid reservoir via an adapter that connects the tubes.

FIG. 3(A) shows a flow-path chip having reservoirs such as a sample liquid reservoir (1), a collection reservoir (2), a discharged liquid reservoir (3), and a sheath liquid reservoir (4). By applying gas pressure to the upper space of the sample liquid in the sample liquid reservoir for a certain period of time, the sample liquid is pushed out from the introduction flow path for the sample liquid (7) connected to the bottom of the sample liquid reservoir. In the same manner, by applying gas pressure to the upper space of the sheath liquid in the sheath liquid reservoir for a certain period of time, the sheath liquid is pushed out. The confluence flow flows through a main flow path (9). In the main flow path, the particle passes through the illumination region (detection region). The optical signal generated when passing through the illumination region is detected, and the control unit determines whether or not the particle is a target particle to be separated based on the optical signal from the detecting unit. When it is determined that the target particle (5) should be separated, a signal to open the electromagnetic valve for a short time is provided, after a delay time for the particle to reach the region that intersects the branched flow path at downstream of the main flow path. As a result, a pulse flow is generated for a short time, and the target particles are taken into the collection reservoir (2) through the collection flow path (10). No pulse flow is generated for the non-target particles, and thus the non-target particles go straight through the main flow path (9) and flow into the discharged liquid reservoir (3) at downstream of the flow path. The upper gas space of the discharged liquid reservoir is airtightly connected to a constant negative pressure air pump via a tube, and is adjusted below atmospheric pressure.

Figure 3:
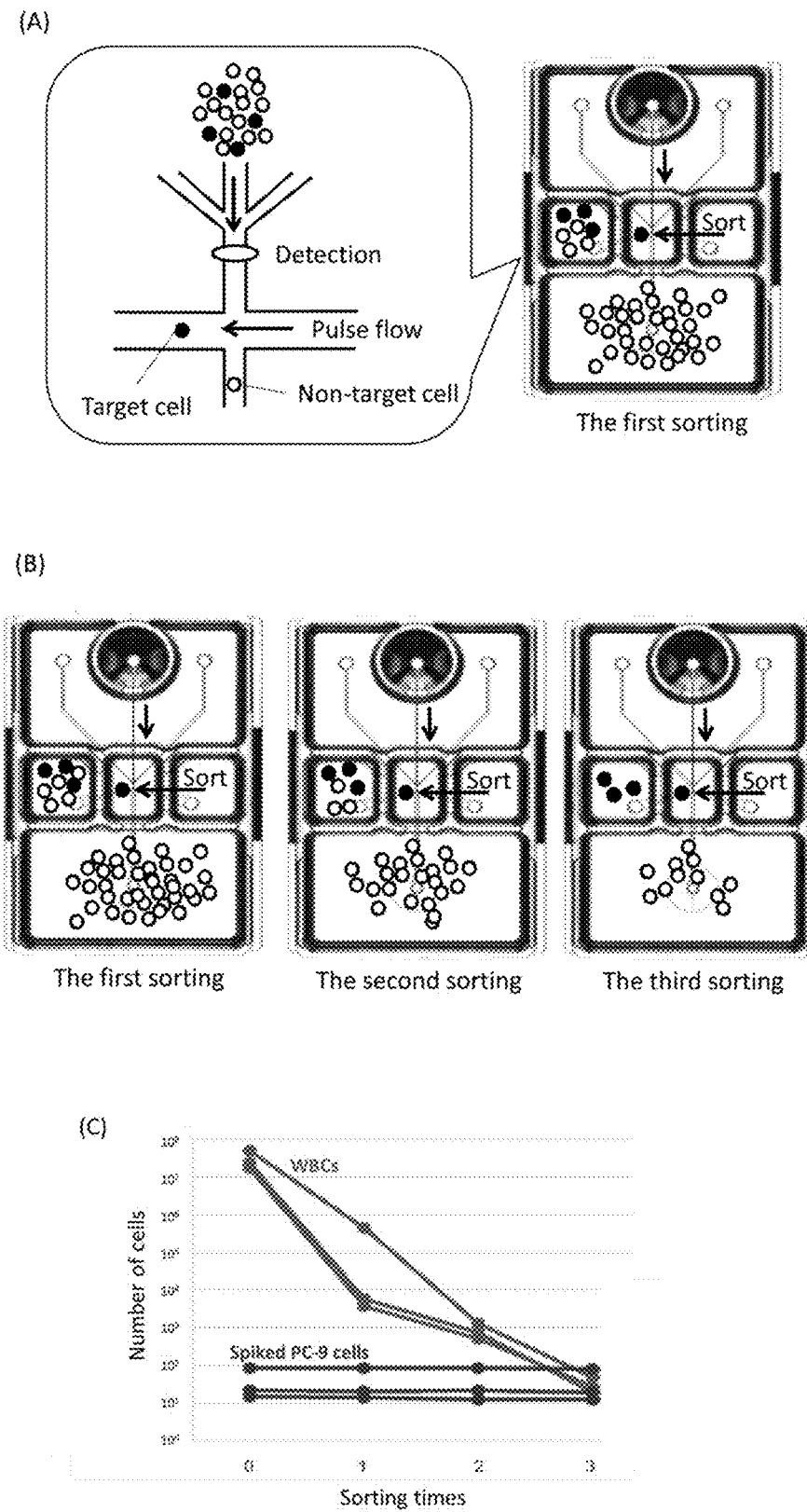
FIG. 3 is a view showing a configuration of tip for using the method for purifying particles of the present invention (A), a conceptual diagram of the repeated sorting (B), and a graph showing results of repeated sorting of PC-9 cells mixed in white blood cells (C).
Figure 4:
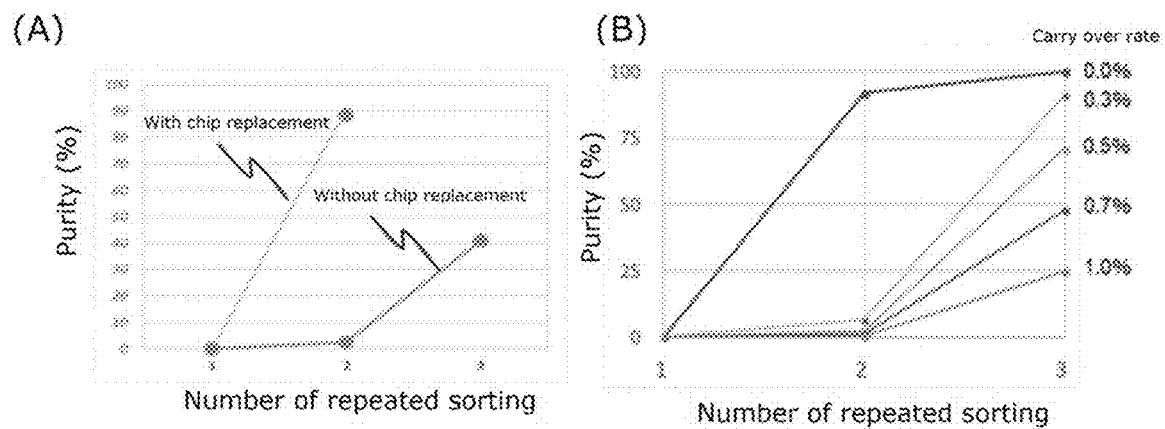
FIG. 4 is a graph of experimental results showing cell purification by repeated sorting of PC-9 of 10 cells mixed in white blood cells when the flow-path chip is replaced with a new one after sorting, or when the same flow-path chip is continuously used after sorting (A), and a graph showing a simulation of cell purification by repeated sorting at leukocyte residual rates (0%, 0.3%, 0.5%, 0.7%, and 1.0%) in the chip (B). The case where the leukocyte residual rate in graph (B) is 0%, is consistent with the experimental result when a new chip is replaced.

It will be explained that the problem with Jet in Air type cell sorter can be solved by repeating sorting. In the first sorting, when the sample solution is placed in the sample liquid reservoir and the entire amount is processed, most of the target particles in the sample liquid are recovered in the collection reservoir. However, in addition to the target particles, the non-target particles that are accidentally pulsed are also recovered in the collection reservoir. Therefore, since the purity thereof is insufficient, the sorting is performed again. That is, the entire particle liquid in the collection reservoir is collected and then returned to the upstream sample liquid reservoir for the second sorting. Before returning the liquid from the collection reservoir to the sample liquid reservoir, the following should be done. A very large proportion of unprocessed non-target particles remain at the bottom of the sample fluid reservoir. Therefore, it is important to return the recovered liquid after removing the remaining particles in the sample liquid reservoir by washing. The second sorting is performed by the above procedure. It is also important that the third sorting is performed after washing the remaining particles on the bottom of the sample liquid reservoir. The sorting is repeated until the desired purity is obtained. FIG. 3 shows that the target cells are gradually concentrated from the non-target cells by repeating the sorting. FIG. 3 (C) is the data showing that 100 or less PC-9 cells intentionally mixed in $10^8$ leukocytes were concentrated by the repeated sorting method. Leukocytes decrease as the number of sortings increases. However, the number of target cells is constant, and thus the purity of PC9 cells increases about 100 times with each sorting (FIG. 3 (C)). The above processing time is within 1 hour, and therefore it can be seen that the value in the column of 100 target cells and $10^8$ non-target cells in FIG. 2 is close to the actual value. FIG. 4 (A) is a data showing that when the added (spiked) number of PC-9 is 10 in FIG. 3, the purity (=PC-9 number/(PC9 number+white blood cell number)) depends on the number of repeated sortings. Both cases are shown when the flow path tip is replaced and when the same tip is used continuously. When the flow path tip is replaced, the purity reaches 90% after two sortings, but when the same tip is used, the purity is about 40% even after the third sortings. This is because the remaining leukocytes in the chip reduce the purity. FIG. 4 (B) shows the results of simulating the final purity by changing the rate of the remaining leukocyte in the chip. When the remaining rate is zero, it reaches 90% in the second sorting, and it corresponds to the case where the flow path chip is replaced, which is reproducible. When the same tip is used, the remaining rate of 0.7% corresponds to the purity of 40% after the third sorting. The 40% of the remaining rate is obtained by washing the bottom of the sample liquid reservoir, and thus it is preferable to perform the washing operation during the repeated sorting. Further, when the sample solution is a patient-derived sample, it is necessary to replace the flow-path chip with a new one in order to prevent cross-contamination between patients.

Next, the method for automating the repeated sorting will be explained. Specifically, the necessary technology and method for solving the problems the conventional cell sorting technology in micro flow path, will be explained. As shown in the data of FIG. 4(B), a mechanism that reduces the number of remaining particles in the flow path for each sorting process by washing, is preferable. Therefore, in the automation of repeated sorting, the mechanism wherein the washing liquid is introduced into the micro flow-path chip and the remaining particles in the flow path is washed, is preferable. The technique described in Patent literature 1 does not include the above mechanism. In the invention of Patent literature 2, In the invention of Patent Document 2, it is not possible to perform the desired number of repeated sorting, due to the structure of the chip. Therefore, the method including the desired number of washing steps is explained below. The following processing method is carried out using a dispensing head that has a liquid suction mechanism and a liquid discharge mechanism.

1) After sorting, each reservoir in the flow path chip opens to atmospheric pressure.
2) The flow path tip is moved laterally to make the dispensing head accessible in the reservoir.
3) Remaining particles in the sample liquid reservoir are washed.
4) The liquid containing the particles in the collection reservoir is sucked up by the pipette of the dispensing head.
5) The liquid in the pipette is discharged into the sample liquid reservoir.
6) The flow path tip is laterally moved to return it to its original position, and the flow path chip and the external air pressure control system are airtightly connected restoratively.

Figure 5:
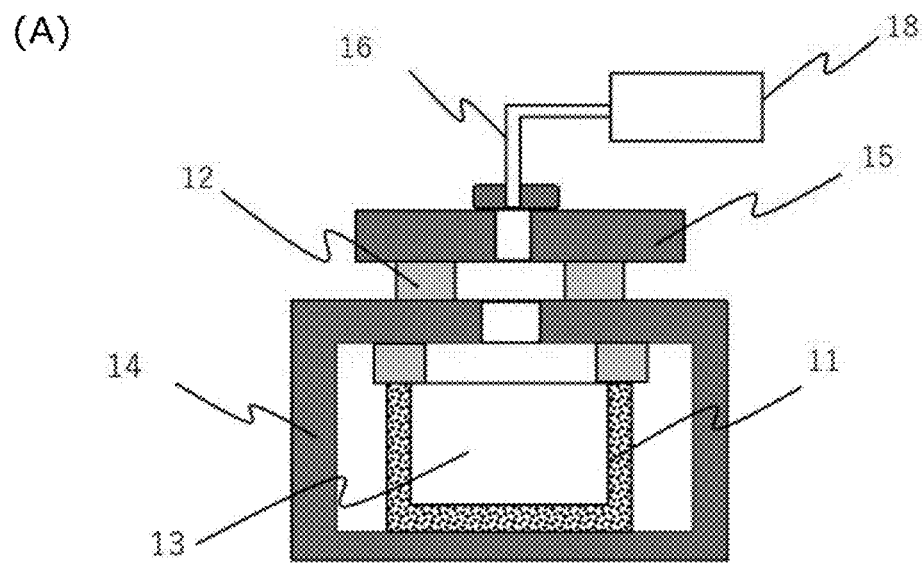
FIG. 5 is views showing a configuration for airtight connection between the reservoir and the air pressure control system in the device (A) and an operation to automatically open to atmospheric pressure (B), in an air pressure control of the sample liquid reservoir, the sheath liquid reservoir, and the discharged liquid reservoir in the flow-path chip.
Figure 5:
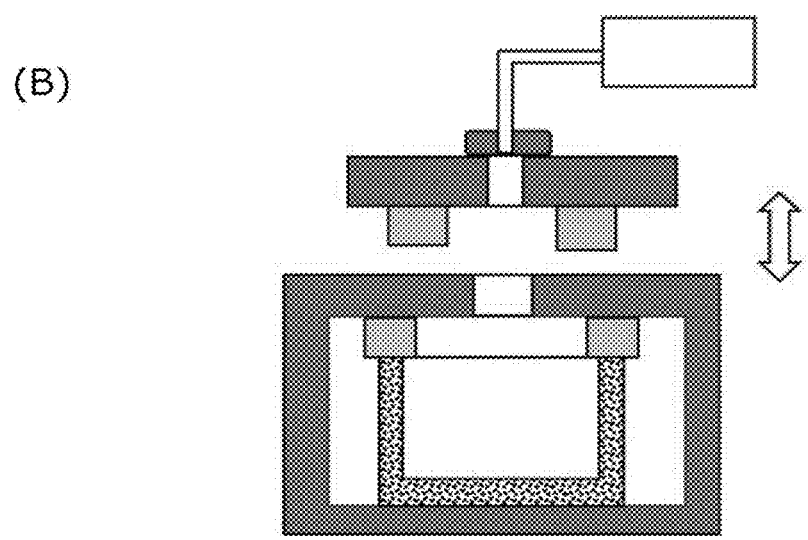
Figure 6:
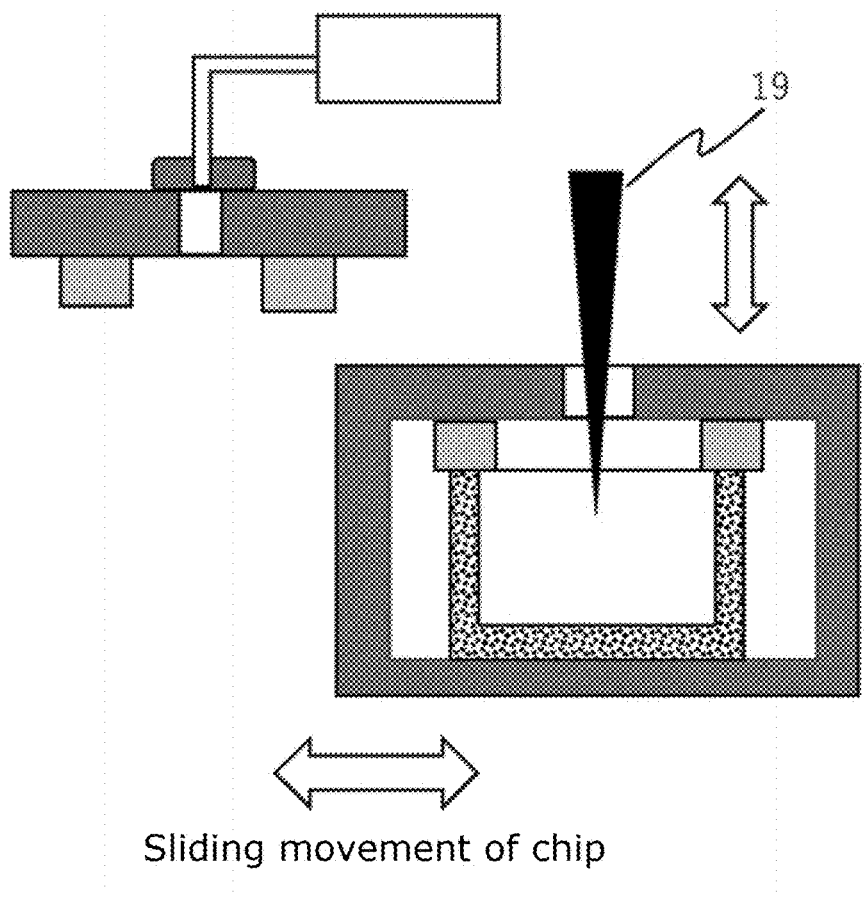
FIG. 6 is a view showing an operation of lateral movement of the flow-path chip for access of the dispensing pipette to each reservoir after opening to atmospheric pressure.

In the above step 1), the flow of the liquid inside the flow path chip is controlled by air pressure from the outside of the flow path chip, and thus the inside of the flow path chip must be opened to atmospheric pressure after each sorting process. The method of automatically opening to atmospheric pressure is shown in FIGS. 5 (A) and (B). In the air pressure control in the flow path chip, the sample liquid server, the sheath liquid reservoir, and the discharged liquid reservoir are airtightly connected to the air pressure control system including the constant pressure air pump installed on the device, via the flow path chip adapter (14) and the pressure control unit (15) on the device, and by using the deformable material rubber (12). The inside of the flow path chip is opened to atmospheric pressure by moving the pressure control unit to the upper part. As shown in FIG. 6, in step 2), an operation in which the flow path tip is laterally moved is carried out, so that the dispensing head can access the reservoir of the flow-path chip. In step 3), the washing liquid is added to the sample liquid reservoir by the dispensing head, and the washing liquid is discarded after pipetting. The washing step in the order of addition of washing liquid, pipetting, and discarding of liquid is repeated a predetermined number of times. In step 4), after washing, the particles are transferred by sucking up the recovered liquid from the collection reservoir and discharging it to the sample liquid reservoir. In step 6), an operation for restoring the airtight connection between the sample liquid reservoir, the discharged liquid reservoir, and the sheath liquid reservoir, and the air pressure control system on the device, is performed, for preparation of the next sorting.

[2] Method for Dispensing a Single Particle

The method for dispensing a single particle of the present invention comprises a step of sorting each one particle into a collection reservoir connected to a flow path and dispensing the one particle from the collection reservoir to another container. Specifically, after sorting one particle, the sorting is temporarily stopped. Then, one particle collected in the collection reservoir is dispensed into another container (for example, a well of a multi-well plate). Then, the sorting is started, one particle is sorted and dispensed into the collection reservoir. By repeating these procedures, one particle can be reliably dispensed into one container (such as one well).

The number of repetitions of the above steps is not particularly limited and can be adjusted according to the number of particles.

The apparatus for dispensing target particles of the present invention can sort the target particles, and singly dispense the target particle. The apparatus comprises a flow-path chip for separating particles contained in a sample liquid. The flow-path chip has flow paths formed in a transparent substrate, and has a sample liquid reservoir, a sheath liquid reservoir, a sorting reservoir, a collection reservoir, and a discharged liquid reservoir which are fluidically-connected to the flow paths. Further, a liquid flow in the flow paths is controlled by an air pressure above each reservoir.

The flow-path chip has an introduction flow path from the sample liquid reservoir, and a confluence flow path in which a pair of sheath liquid introduction flow paths arranged on both sides are joined to the introduction flow path. Further, the flow-path chip has an illumination region for detecting the particle at downstream of the confluence flow path, and a pair of branched flow paths that are connected to the side of the confluence flow path so as to face each other at further downstream of the confluence flow path. The sorting reservoir is connected to one of the pair of branched flow paths, and the collection reservoir is connected to the other of the branched flow paths. Furthermore, an upper part of the collection reservoir can be opened to atmospheric pressure. The apparatus for dispensing target particles of the present invention comprises a configuration in which sorting is stopped after sorting one target particle into the collection reservoir and one target particle is dispensed from the collection reservoir into another container.

In the method for dispensing a single particle of the present invention, for example, a single cell is dispensed with each single cell sorting.

For example, when about hundreds of specific target cells are contained in about $10^8$ of non-target cells, a method for dispensing the target cells into a multi-well plate will be explained. For example, in the case that a cell suspension containing the target cells purified to about 98% purity by repeated sorting of the method for purifying particles is stored in the collection reservoir, a method of dispensing the target cells will be explained, but it is not limited thereto. As shown in FIG. 7, the cell suspension in the collection reservoir is returned to the sample liquid reservoir and the cells are sorted. As shown in FIG. 8 (A), the liquid is dispensed from the collection reservoir, which is always open to atmospheric pressure, to each well in the multi-well plate by moving the liquid using the dispensing head. For example, in the case that one cell is dispensed, the pressure in the sample liquid reservoir is reduced after sorting one cell by one pulse flow, and the flow of the sample liquid is stopped. Then, one cell is dispensed from the collection reservoir into each well of the multi-well plate by the pipette of the dispensing head. These operations allow individual dispensing of target cells and prevent loss of dispensing of target cells passing through the sorting region during the dispensing operation. For example, if 10 cells are dispensed into a well, the flow is stopped after 10 sortings in which 10 cells are sorted. Then, 10 cells are dispensed from the collection reservoir into a well of the multi-well plate using the pipette with the dispensing head. Then, the sorting is resumed before the dispensing head returns to the collection reservoir. By dispensing all cells in the collection reservoir after a total of 10 sortings, 10 cells can be dispensed together. The number of cells to be dispensed into each well can be appropriately determined, and the dispensing can be carried out using the flowchart shown in FIG. 8 (B). This flowchart does not show an operation to prevent the loss of the sample liquid by outflow during the dispensing. If the time between detecting the target cells is shorter than the time of the dispensing operation, cell loss occurs due to the outflow of the sample solution. That is, for example, the time required for the dispensing operation is about 5 seconds. Therefore, if the target cells are detected at intervals shorter than the dispensing time, cell loss will occur. Therefore, it is desirable to adjust the concentration of the target cells so that one or less target cells flow every 5 seconds. FIG. 9 shows a flowchart of the conditions in the above case.

<<Dispensing of Water in Oil Droplets>>

In one embodiment of the method for dispensing a single particle of the present invention, the particle is a water in oil droplet in a fluorocarbon oil, the fluorocarbon oil and a mineral oil are contained in the collection reservoir in advance, a target water in oil droplet is sorted based on a fluorescence signal, the water in oil droplet is taken up in the collection reservoir one by one, and floats from a bottom of the collection reservoir, and the water in oil droplet is trapped at the dome-shaped interface between the fluorocarbon oil and mineral oil in the collection reservoir, and the water in oil droplet is sucked up from up above and dispensed into an external container.

The fluorocarbon oil used in the dispensing method of the present invention, is not particularly limited, but there may be mentioned Novec7500 which is 3M Fluorocarbonrt oil, as a commercial product. The mineral oil used in the dispensing method of the present invention, is not particularly limited, but there may be mentioned Sigma-Aldrich's mineral oil, as a commercial product.

The amount of fluorocarbon oil contained in the collection reservoir is not particularly limited, but is 10 µL to 1 mL. The amount of mineral oil contained in the collection reservoir is not particularly limited, but is 10 µL to 1 mL.

As to the water in oil droplet in the fluorocarbon oil, water in oil droplets float in fluorocarbon oil because fluorocarbon oil has a higher specific density than water. Further, on the surface of the fluorocarbon oil, the water in oil droplets are adsorbed to the wall surface of the plastic resin, as shown in the photograph of FIG. 11 (A). Therefore, it is difficult to suck up the water in oil droplet one by one with a pipette from above the fluorocarbon oil. As a method to solve this problem, mineral oil is used as a cover for fluorocarbon oil as shown in FIG. 11 (B). In this case, the mineral oil and the fluorocarbon oil form the dome-shaped interface, and the water in oil droplets in the fluorocarbon oil are trapped at an upper of the dome-shaped interface. In the photograph of FIG. 11 (B), it can be seen that the water in oil droplets are distributed in a dome shape because the water in oil droplets contain a dye.

Accordingly, by pre-adding the fluorocarbon oil and the mineral oil to the collection reservoir, the sorted water in oil droplets are trapped at the center of the reservoir. Therefore, the water in oil droplets are easily sucked up from the collection reservoir with the pipette. This will be explained below using FIG. 10

When water in oil droplets are formed in oil, the formed droplets do not always contain a cell. That is, based on the Poisson distribution, there are about 1/10 of the total number of water in oil droplets with one or less cells. Therefore, it is necessary to sort the water in oil droplets in order to separate the water in oil droplets containing a cell. Emulsions containing cells are sorted based on signals such as sideward scattering light signals generated when passing through the laser illumination region (20) and autofluorescence signals of cells.

In this sorting, a fluorocarbon oil is used as a sheath flow. When the water in oil droplet containing the cell reaches the sorting region, a pulse flow is generated. Then, the water in oil droplets are taken into a collection flow path, and only the water in oil droplets containing the cell are accumulated in the collection reservoir. As mentioned above, the droplets containing the cell are about 1/10, and thus a single sorting gives about 98% purity. Then, after sorting the water in oil droplets one by one, the water in oil droplets are trapped in the upper center of the dome-shaped interface at the top of the collection reservoir. Therefore, the water in oil droplets can be easily sucked up with a pipette and dispensed into a multi-well plate.

Next, in order to demonstrate that it is possible to dispense the water in oil droplets one by one, the following operation was performed. A water-soluble fluorescent reagent (FITC) was added to the liquid that forms the water in oil droplets so that the formed droplets can be identified by fluorescence. After sorting one water in oil droplet with fluorescence, one water in oil droplet before dispensing was observed in the collection reservoir. In addition, the water in oil droplet was observed after dispensing into a well of a 384-well plate with a pipette. The results are shown in FIG. 12.

FIG. 12 (A) is a microscope photograph showing the water in oil droplet (40 µm of diameter) trapped an inside the upper part of the dome-shaped interface between the fluorocarbon oil and the mineral oil, in which the microscope photograph is taken from the bottom of the collection reservoir before dispensing. FIG. 12 is a microscope photograph of the water in oil droplet which is sucked up with the pipette of the dispensing head and dispensed into the well in the 384-well plate together with the mineral oil and the fluorocarbon oil. In mineral oil, a small amount of fluorocarbon oil becomes a sphere. A water in oil droplet is observed in the sphere, and therefore it can be seen that it can be dispensed one by one.

The configuration of the flow path chip that forms water in oil droplets in fluorocarbon oil will be explained below. The problem can be solved by the following configuration. Specifically, the configuration without a collection reservoir is appropriate. As shown in FIG. 13, an oil reservoir and a sample liquid reservoir are formed on the flow path tip, and a water in oil droplet is formed at the intersection of the oil flow path and the sample liquid flow path. Then, at downstream of the flow path, the emulsion is collected by a tube connected downward thereto. In the configuration shown in FIG. 14, an oil reservoir and a sample liquid reservoir are formed on the flow path tip. A water in oil droplet is formed at the intersection of the oil flow path and the sample liquid flow path and then the emulsion is collected by a tube connected in the horizontal direction. FIG. 15 (A) is a photograph of the droplet forming flow path region when the water in oil droplets are formed by using emulsion forming flow-path chip for a collection method using a vertical tube described in FIG. 13. FIG. 15 (B) is a photograph of the wide flow path region of downstream of the droplet forming flow path region.

[3] Method for Analyzing Cell Cluster

In the method for analyzing cell cluster of the present invention, a flow cytometry data is analyzed. A ratio between a forward scattered light signal intensity and a scattered light signal intensity other than forward detected in each cell is calculated, and whether individual cells are single cells or cell cluster are identified by the obtained value of the ratio. The scattered light signal intensity other than forward detected is not particularly limited, but is preferably a side scattered light signal intensity, or a back scattered light signal intensity.

The apparatus for analyzing cell cluster of the present invention is a flow cytometer, and ratios between plural scattered light signals are calculated, and whether single cell or cell cluster is identified by using values thereof.

In the method for analyzing cell cluster of the present invention, individual cell clusters are quantitatively analyzed.

The forward scattered light signal (FSC) is an intensity of the scattered light component at a low angle in the light irradiation direction and mainly means the scatterer size. On the other hand, the sideward scattering signal component (SSC) is an intensity of the scattered light component at a high angle in the light irradiation direction, and mainly means the microstructure in the scatterer. These are consistent with the results based on the Mie's theory of light scattering. Here, a method of distinguishing a single cell from a cell cluster based on the numerical value of the signal intensity ratio between FSC and SSC will be explained below using actual data. FIG. 17(A) is a histogram distribution of SSC/FSC values of PC-9 cells (cell line). FIG. 17(B) is a histogram distribution of SSC/FSC values of granulocytes, which are leukocyte components. FIG. 17(C) is a histogram distribution of SSC/FSC values of leukocyte clusters. PC-9s are single cells, and the granulocytes are single cells with intracellular microstructures. The leukocyte clusters were confirmed to be clusters consisting of multiple cells according to the amount of nuclear staining. The states of the above three types of cells can be distinguished by using the flow cytometric data of the mixture of leukocytes, leukocyte clusters, and PC-9 cells (cell line) shown in FIG. 16.

In the graph of FIG. 16, the horizontal axis shows Hoechst stain and the vertical axis shows cytokeratin stain. PC9, which is an epithelial cell, are distributed in the area surrounded by the box marked P25, and the expression level of cytokeratin is high. On the other hand, granulocytes are distributed in the area surrounded by the box marked P23, and have high nuclear staining levels among leukocyte components, and are weakly positive for cytokeratin. In contrast, leukocyte clusters are distributed in the area surrounded by the box marked P26, and the amount of nuclear staining and the amount of cytokeratin staining are correlated. These leukocyte clusters are considered to be granulocyte clusters. Neutrophils are also one of the granulocyte components, and thus it is important to count the leukocyte clusters of P26. It is important to determine whether or not there are any leukocyte clusters, after the CTC(s) are sorted. According to the histogram distributions in FIGS. 17 (A), (B), and (C), the leukocyte clusters are distributed from about 0.2 to 1. However, the histogram distribution of 0.2 to 0.3 overlaps with the histogram distribution of granulocytes. Therefore, it is desirable to confirm by microscopic observation. Therefore, it is desirable to confirm it by microscopic observation. In the case that CTC(s) are sorted, it can be easily identified by using a combination with other fluorescent staining. However, for general purposes, it is important to be able to identify only by scattered light signals. FIG. 18 shows the flow cytometry data of a sample in which cytokeratin-positive cells were collected from the blood of a cancer patient and concentrated, as a two-dimensional scatter plot of the cytokeratin fluorescence signal intensity and the SSC/FSC values. Clustered cytokeratin-positive cells can be identified from the graph. That is, the CTC clusters can be counted by the number of samples in the quantified numerical range of the SSC/FSC value and the cytokeratin signal value.

EXAMPLES

The present invention now will be further illustrated by, but is by no means limited to, the following Examples.

Example 1

In this example, circulating tumor cells (CTC) of a cancer patient were sorted by the repeated sorting.

8 mL of blood was collected from a cancer patient and placed in a blood storage tube. The following pretreatment was performed within 2 days. 8 mL of blood contains about $10^8$ white blood cells. The containers used in the following pretreatments were previously washed and coated with 0.5% BSA/On-chip T-buffer, in order to prevent a loss of cells due to adsorption of cells to the resin containers. Commercially available reagents such as an erythrocyte hemolysis buffer, a fixation reagent, a cell permeability reagent, and a FCR blocker were used as the buffers and reagents used in the pretreatment. The protocols thereof were in accordance with the attached documents of the reagents.

Pretreatment (I)

The collected blood was treated in the order of hemolysis, removal and washing of erythrocyte debris by centrifugation, fixation, permeation treatment, and fluorescent staining (cytokeratin antibody only). Erythrocytes were removed from the sample liquid by these treatments, and it was considered that $10^8$ leukocytes contained several or more CTCs. Since the sample liquid before treatment was adjusted to 0.3 mL, the cell concentration was about $3.3 \times 10^8$ cells/mL.

CTC Sorting Treatment (I)

Only CTCs derived from cancer cells, which are epithelial cells, are cytokeratin-positive, and granulocytes, which are leukocyte components, are weakly positive for cytokeratin. Therefore, the condition for identifying and sorting CTCs is to set the cytokeratin-positive signal level higher than the cytokeratin fluorescence signal level of granulocytes, whereby the cytokeratin-positive cells were sorted. When the sorting was repeated twice under these conditions, the number of leukocytes decreased to about $10^3$. FIG. 3 shows the number of leukocytes reduced by repeated sorting. These are the data of a sample in which lung cancer-derived cell line PC-9 was added (spiked) in 4 mL of blood, and are the graph of white blood cell count and PC-9 count for each number of repeated sortings.

Pretreatment (II)

The samples with reduced leukocytes were stained with Hoechst nuclear, fluorescent labeled cytokeratin antibody for additional staining, fluorescent labeled CD45 antibody, fluorescent labeled vimentin antibody, fluorescent labeled PD-L1 antibody, (or fluorescent labeled HER2 antibody, fluorescent labeled EGFR antibody, fluorescent labeled AXL antibody). After staining, the cells were washed by centrifugation with 0.5% BSA/On-chip T-buffer buffer.

CTC Sorting Treatment (II)

CTCs were identified by repeated sorting for separating CTCs under a condition of Hoechst-positive, CD45-negative, and cytokeratin-positive. In the experiment in which the known number of PC-9 cells (cell lines) was added to blood, the recovery rate was >70% and the purity was >80% according to the above CTC concentration method.

INDUSTRIAL APPLICABILITY

The method for purifying particles of the present invention, i.e., a method for separating a small number of target cells from a cell population having a total number of cells of about $10^8$ or more, can be used for collecting and analyzing CTC from the blood of cancer patients, as shown in Examples. In addition, it can be used for antibody screening to select cells that produce antibodies that specifically bind to the antigen of interest from a large number of antibody-producing cells in antibody drug development. Furthermore, in the method for dispensing a single particle of the present invention, when the particles are water in oil droplets, cell secretions are accumulated in the water in oil droplets without diffusing, and therefore, it can be used for sorting cells that secrete specific substances. Furthermore, since the lysate of cells does not diffuse even if the cells are lysed in the water in oil droplets, it can be used for an expression analysis of cells.

REFERENCE SIGNS LIST

1 . . . Sample liquid reservoir formed on flow-path chip;
2 . . . Collection reservoir formed on flow-path chip;
3 . . . Discharged liquid reservoir formed on flow-path chip;
4 . . . Sheath liquid reservoir formed on flow-path chip;
5 . . . Target cells or target particles;
6 . . . Non-target cells or non-target particles;
7 . . . Introduction flow path for the sample liquid;
8 . . . Sheath flow path;
9 . . . Main flow path;
10 . . . Collection flow path;
11 . . . Flow-path chip;
12 . . . Elastic deformation parts for airtightness (Rubber);
13 . . . Reservoir formed on flow-path chip;
14 . . . Flow-path chip adapter;
15 . . . Pressure control unit (Airtight connection adapter on device);
16 . . . Air piping tube;
17 . . . Pipet of dispensing head;
18 . . . Constant air pump (such as electropneumatic regulator or cylinder pump);
19 . . . Pipette at tip of the dispensing head;
2 . . . Illumination region (Detection region);
21 . . . Fluorocarbon oil;
22 . . . Mineral oil;
23 . . . Droplet in fluorocarbon oil;
24 . . . Multi-well plate;
25 . . . Sample liquid reservoir;
26 . . . Oil reservoir;
27 . . . Water in oil droplet formation region (intersection of oil flow path and sample liquid flow path);
28 . . . Water in oil droplet collection tube;
29 . . . Resin container;
30 . . . Well in the 384-well plate;

The invention claimed is:

1. A method for dispensing a single particle, characterized in that the method comprises a step of sorting each one particle into a collection reservoir and dispensing the one particle via the collection reservoir to a well plate, wherein a detected scattered light or fluorescence generated from the single particle is corresponded to the dispensed single particle, and the correspondence of the detected scattered light or fluorescence generated from the single particle and the dispensed single particle, is carried out by temporarily stopping a sorting in each one particle, dispensing the particle into the well plate, and restarting a sorting.

2. The method for dispensing a single particle according to claim 1, wherein the particle is a water in oil droplet in a fluorocarbon oil, a sorted water in oil droplet is taken into a branched flow path, the branched flow path is connected to the collection reservoir, the fluorocarbon oil and a mineral oil are contained in the collection reservoir in advance, the water in oil droplet floats to an upper surface of the fluorocarbon oil from a bottom of the collection reservoir, and dispensed into the well plate in each one particle.

3. The method for dispensing a single particle according to claim 2, wherein the water in oil droplet is trapped at a dome-shaped interface between the fluorocarbon oil and mineral oil in the collection reservoir, and the water in oil droplet is dispensed into the well plate in each one particle.

4. A method for dispensing a single particle, characterized in that the method comprises a step of sorting each one particle into a collection reservoir and dispensing the one particle via the collection reservoir to a well plate, wherein a detected scattered light or fluorescence generated from the single particle is corresponded to the dispensed single particle, wherein the particle is a water in oil droplet in a fluorocarbon oil, a sorted water in oil droplet is taken into a branched flow path, the branched flow path is connected to the collection reservoir, the fluorocarbon oil and a mineral oil are contained in the collection reservoir in advance, the water in oil droplet floats to an upper surface of the fluorocarbon oil from a bottom of the collection reservoir, and dispensed into the well plate in each one particle.

* * * * *